(12) United States Patent
Miyazaki et al.

(10) Patent No.: US 9,317,199 B2
(45) Date of Patent: Apr. 19, 2016

(54) SETTING A DISPLAY POSITION OF A POINTER

(71) Applicant: INTERNATIONAL BUSINESS MACHINES CORPORATION, Armonk, NY (US)

(72) Inventors: Masashi Miyazaki, Kanagawa (JP); Tomoka Mochizuki, Tokyo (JP); Tomohiro Shimizu, Tokyo (JP); Tomonori Sugiura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 14/173,326

(22) Filed: Feb. 5, 2014

(65) Prior Publication Data

US 2014/0225829 A1 Aug. 14, 2014

(30) Foreign Application Priority Data

Feb. 8, 2013 (JP) .................................. 2013-023648

(51) Int. Cl.
*G06F 3/041* (2006.01)
*G06F 3/043* (2006.01)
*G06F 3/0488* (2013.01)

(52) U.S. Cl.
CPC .................................. *G06F 3/0488* (2013.01)

(58) Field of Classification Search
CPC ... G06F 3/041; G06F 3/0412; G06F 3/04812; G06F 3/0485; G06F 3/0488
USPC .................................................. 345/173–178
See application file for complete search history.

(56) References Cited

U.S. PATENT DOCUMENTS

| 5,455,906 | A | * | 10/1995 | Usuda | 345/536 |
| 8,976,140 | B2 | * | 3/2015 | Hirata | 345/173 |
| 2007/0257890 | A1 | | 11/2007 | Hotelling et al. | |
| 2009/0070670 | A1 | * | 3/2009 | Kishi | 715/702 |
| 2009/0146968 | A1 | | 6/2009 | Narita et al. | |
| 2009/0251410 | A1 | | 10/2009 | Mori et al. | |
| 2014/0160073 | A1 | * | 6/2014 | Matsuki | 345/174 |

FOREIGN PATENT DOCUMENTS

| JP | 2003-208262 | 7/2003 |
| JP | 2004-078323 | 3/2004 |
| JP | 2011-164746 | 8/2011 |
| JP | 2012-113745 | 6/2012 |

* cited by examiner

*Primary Examiner* — Kent Chang
*Assistant Examiner* — Nelson Rosario
(74) *Attorney, Agent, or Firm* — Law Office of Jim Boice (57) ABSTRACT

A control apparatus includes: an operation reception unit receiving a reference setting operation, and a position designation operation after the reference setting operation, that are input by a user touching an input unit provided on a display surface of a display unit; a reference position setting unit setting a reference position at a position shifted toward a periphery of the input unit from the position of the reference setting operation on the input unit; and a display control unit setting, depending on the reference position and the position of the position designation operation, a display position of a pointer for selecting a position on the display unit.

17 Claims, 10 Drawing Sheets

SETTING A DISPLAY POSITION OF A POINTER

This application is based on and claims the benefit of priority from Japan (JP) Patent Application 2013-023648, filed on Feb. 8, 2013, and herein incorporated by reference in its entirety.

BACKGROUND

The present invention relates to a control apparatus and a control program for setting a display position of a pointer.

An apparatus that displays a cursor, etc., at a position different from a touched position on an input unit such as a touch panel is known. In this apparatus, the cursor is displayed on a line extending from a predetermined reference position through the touched position on the input unit. The above apparatus has a problem of low operability because the reference position is set with respect to multiple input positions.

SUMMARY

A first aspect of the present invention provides a control apparatus including: an operation reception unit receiving a reference setting operation, and a position designation operation after the reference setting operation, that are input by a user touching an input unit provided on a display surface of a display unit; a reference position setting unit setting a reference position at a position shifted toward a periphery of the input unit from the position of the reference setting operation on the input unit; and a display control unit setting, depending on the reference position and the position of the position designation operation, a display position of a pointer for selecting a position on the display unit.

A second aspect of the present invention provides a control program causing a computer to display an image, including: an operation reception module receiving a reference setting operation, and a position designation operation after the reference setting operation, that are input by a user touching an input unit provided on a display surface of a display unit; a reference position setting module setting a reference position at a position shifted toward a periphery of the input unit from the position of the reference setting operation on the input unit; and a display control module setting, depending on the reference position and the position of the position designation operation, a display position of a pointer for selecting a position on the display unit.

The above summary of the invention does not list all of necessary features of the present invention. Subcombinations of the group of features may also constitute the present invention.

DETAILED DESCRIPTION

While the present invention will be described below with reference to embodiments thereof, the embodiments below are not intended to limit the present invention set forth in the claims. Not all combinations of features described in the embodiments are essential to the solution of the present invention.

Figure 1:
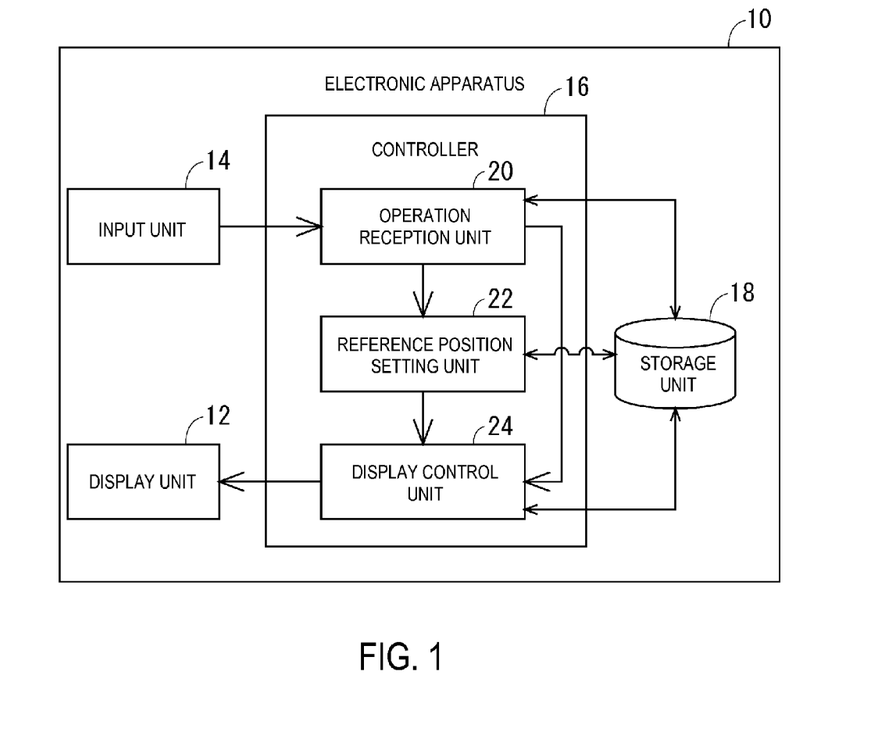
FIG. 1 is an overall configuration diagram of an electronic apparatus 10 according to an embodiment.

FIG. 1 is an overall configuration diagram of an electronic apparatus 10 according to an embodiment. An example of the electronic apparatus 10 is a mobile device that can display images, such as a smart phone or a tablet computer. When a user selects images, etc., displayed on a display unit 12, the electronic apparatus 10 facilitates the user's selection of an image, etc., at a position hard to reach with the user's thumb or finger, etc., on an input unit 14. The electronic apparatus 10 may also be a display apparatus for exhibition having a large display that can display images. In this case, the large-size electronic apparatus 10 facilitates the user's selection of an image, etc., at a position hard to reach even with both of the user's hands on the input unit 14.

As shown in FIG. 1, the electronic apparatus 10 includes the display unit 12, the input unit 14, a controller 16, and a storage unit 18.

The display unit 12 displays images, including text and graphics, output according to the operation of components such as the controller 16. Examples of the display unit 12 are a liquid crystal display and an organic EL display. Examples of images displayed on the display unit 12 are a setting screen for configuring the electronic apparatus 10, and an image obtained via, e.g., the Internet. The display unit 12 in the embodiment has a size of several inches, for example.

An example of the input unit 14 is a light-transmissive touch panel. The input unit 14 is provided on substantially the entire display surface on the front side of the display unit 12, i.e., the side facing the user. The input unit 14 and the display unit 12 are controlled by the controller 16 on the basis of their respective coordinates corresponding to each other. The input unit 14 outputs the coordinates of positions touched by the user to the controller 16. While looking at images displayed on the display unit 12, the user inputs operations through the input unit 14 by touching the input unit 14.

An example of the controller 16 is a processing unit such as a CPU. The controller 16 includes an operation reception unit 20, a reference position setting unit 22, and a display control unit 24. The controller 16 reads and executes a control program stored in the storage unit 18 to function as the operation reception unit 20, the reference position setting unit 22, and the display control unit 24. The controller 16 may implement part or all of the operation reception unit 20, the reference position setting unit 22, and the display control unit 24 using hardware such as circuits, or using combinations of hardware and functions of the control program.

The operation reception unit 20 receives, from the input unit 14, operations input by the user touching the input unit 14. For example, the operation reception unit 20 receives a predetermined switching operation for switching between a normal mode and an extension mode from the input unit 14. In the normal mode, a position touched by the user on the input unit 14 is set as a selected area selected by the user. In the extension mode, a position away from a position touched by the user on the input unit 14 is set as a position selected by the user. The operation reception unit 20 outputs the received switching operation to the display control unit 24.

In the normal mode, the operation reception unit 20 receives a position designation operation that is input on the input unit 14. A position designation operation in the normal mode is an operation for setting a selected area. In the extension mode, the operation reception unit 20 receives a reference setting operation followed by a position designation operation that are input on the input unit 14. A reference setting operation is an operation for setting a reference position serving as a reference for a display position at which a pointer such as a cursor is displayed. The operation reception unit 20 outputs the coordinates of the position of the reference setting operation to the reference position setting unit 22. A position designation operation in the extension mode is an operation for setting a display position of the pointer. The operation reception unit 20 outputs the coordinates of the position of the position designation operation to the display control unit 24.

The reference position setting unit 22 sets the reference position based on the coordinates of the position of the reference setting operation received from the operation reception unit 20. Specifically, the reference position setting unit 22 sets the reference position at a position shifted toward the periphery of the input unit 14 from the position of the reference setting operation on the input unit 14. The reference position setting unit 22 outputs the coordinates of the set reference position to the display control unit 24.

The display control unit 24 controls image display of the display unit 12. The display control unit 24 switches between the normal mode and the extension mode according to a switching operation received by the operation reception unit 20. The manner of selection on the display unit 12 differs between the normal mode and the extension mode. In the normal mode, the display control unit 24 sets, at the position of the position designation operation, a selected area for selecting a position on the display unit 12. That is, a selected area is set at the position touched by the user. In the extension mode, the display control unit 24 sets the display position of the pointer for selecting a position on the display unit 12, depending on the reference position and the position of the position designation operation. For example, the display control unit 24 sets the display position of the pointer on an extended line extending from the reference position through and beyond the position of the position designation operation.

The storage unit 18 stores information on images and operations, and the control program. For example, the storage unit 18 stores the coordinates of a position on the input unit 14 at which an operation has been input. The storage unit 18 stores an extension scale factor. The extension scale factor is used for setting the position of the pointer upon input of a position designation operation.

Figure 2:
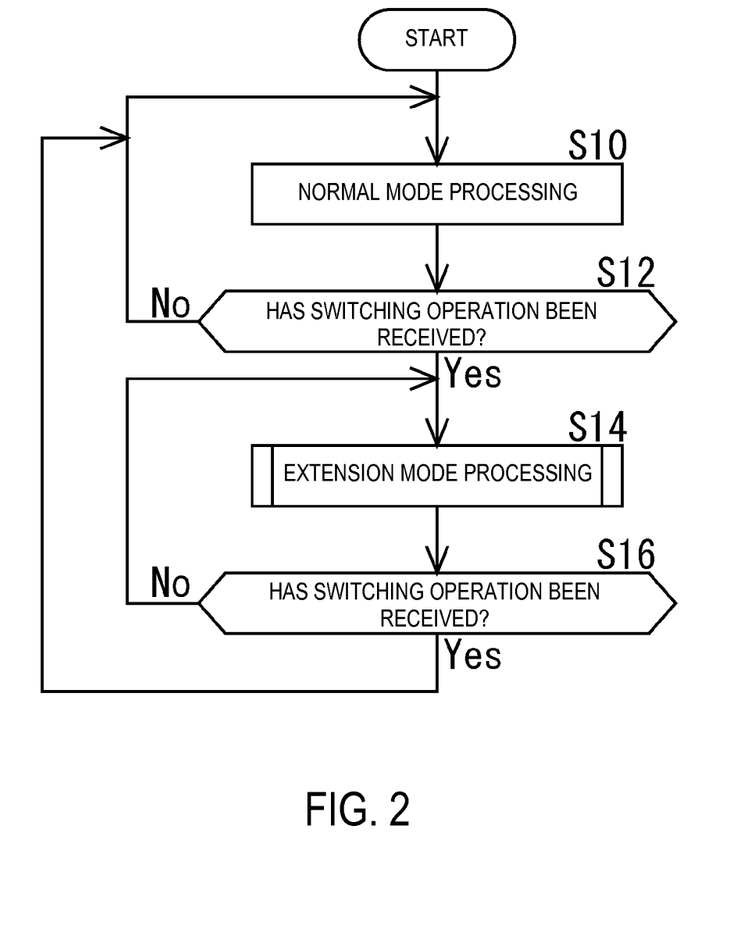
FIG. 2 is a flowchart describing a control process.

Now, a control process performed by the electronic apparatus 10 will be described. FIG. 2 is a flowchart describing the control process.

As shown in FIG. 2, when the electronic apparatus 10 is powered on and the control process is started, normal mode processing is performed (S10). In the normal mode, the operation reception unit 20 sets, as a selected area, a position touched by the user on the input unit 14.

The operation reception unit 20 determines whether a switching operation has been received (S12). For example, the operation reception unit 20 receives a switching operation if the same position on the input unit 14 is touched for a duration longer than a predetermined threshold time for switching operation. The normal mode processing is performed until the operation reception unit 20 determines that a switching operation has been received (S12: No). If the operation reception unit 20 determines that a switching operation has been received (S12: Yes), extension mode processing is performed (S14). The extension mode will be described later.

After the extension mode processing is performed, the operation reception unit 20 determines whether a switching operation has been received (S16). The extension mode processing is continued until the operation reception unit 20 receives a switching operation (S16: No). If the operation reception unit 20 has received a switching operation (S16: Yes), the processing is switched to the normal mode.

Figure 3:
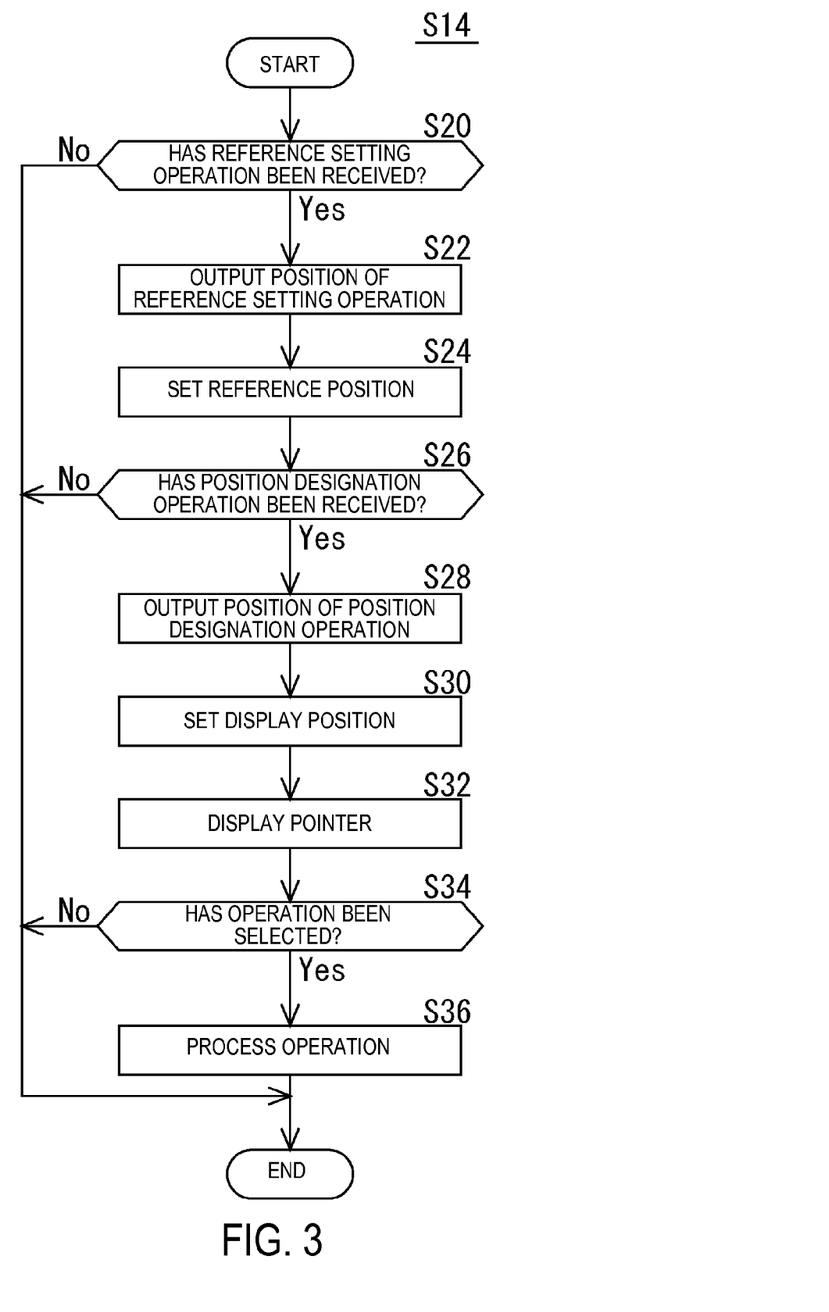
FIG. 3 is a flowchart describing extension mode processing.

FIG. 3 is a flowchart describing the extension mode processing. As shown in FIG. 3, in the extension mode processing, the operation reception unit 20 determines whether a reference setting operation has been received (S20). Step S20 is preferably omitted if the reference position is already set: this allows the reference position to be fixed while the extension mode is continued, thereby facilitating the user's operation. If the operation reception unit 20 has not received a reference setting operation (S20: No), step S16 described above is performed. If the operation reception unit 20 determines that a reference setting operation has been received (S20: Yes), the operation reception unit 20 outputs, to the reference position setting unit 22, the coordinates of the position on the input unit 14 at which the reference setting operation has been received (S22).

The reference position setting unit 22 sets the reference position based on the coordinates of the position of the reference setting operation obtained from the operation reception unit 20 (S24). The reference position setting unit 22 sets the reference position at a position shifted from the position of the reference setting operation toward the periphery with respect to the center of the display unit 12 and the input unit 14.

The operation reception unit 20 determines whether a position designation operation has been received (S26). If the operation reception unit 20 determines that a position designation operation has not been received (S26: No), step S16 described above is performed. If the operation reception unit 20 determines that a position designation operation has been received (S26: Yes) as a result of the user's touch on the input unit 14, the operation reception unit 20 outputs, to the display control unit 24, the coordinates of the position on the input unit 14 at which the position designation operation has been received (S28).

The display control unit 24 sets a display position based on the coordinates of the position of the position designation operation obtained from the operation reception unit 20

(S30). The display control unit 24 displays the pointer at the display position on the display unit 12 (S32). The operation reception unit 20 then determines whether an operation has been selected (S34). For example, if a predetermined time period passes while the position touched by the user remains unmoved, the operation reception unit 20 determines that an operation indicated at the display position of the pointer has been selected (S34: Yes), and the corresponding operation is processed (S36). If the operation reception unit 20 determines that an operation has not been selected (S34: No), step S16 described above is performed.

The operation here refers to an operation such as making various settings or moving to another webpage on the Internet. The operation may also be selected with a gesture such as a double tap. In this case, after the finish of a touch by the user, the operation reception unit 20 continues the extension mode for at least a predetermined period, for example 0.5 seconds. If the user again touches the input unit 14 during the continued extension mode, the operation reception unit 20 receives the touches as a double tap. Thereafter, the extension mode is continued until a switching operation is received in step S16. During the extension mode, as the user moves the user's thumb or finger, etc., while keeping it on the input unit 14, the pointer moves correspondingly.

Now, the normal mode, and the setting of the reference position and the display of the pointer in the extension mode will be described in detail.

Figure 4:
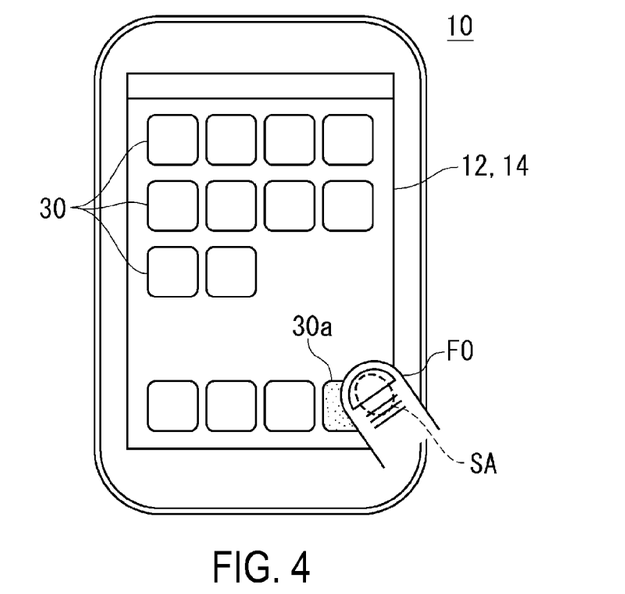
FIG. 4 is a diagram describing a normal mode in step S10.

FIG. 4 is a diagram describing the normal mode in step S10. As shown in FIG. 4, the display control unit 24 displays multiple operation buttons 30 on the display unit 12.

In the normal mode, when the user's thumb or finger F0, etc., touches the input unit 14, the touched area is received as a selected area SA. Accordingly, an operation button 30*a* in the selected area SA is received by the operation reception unit 20. Processing corresponding to the operation button 30*a* is then performed.

Figure 5:
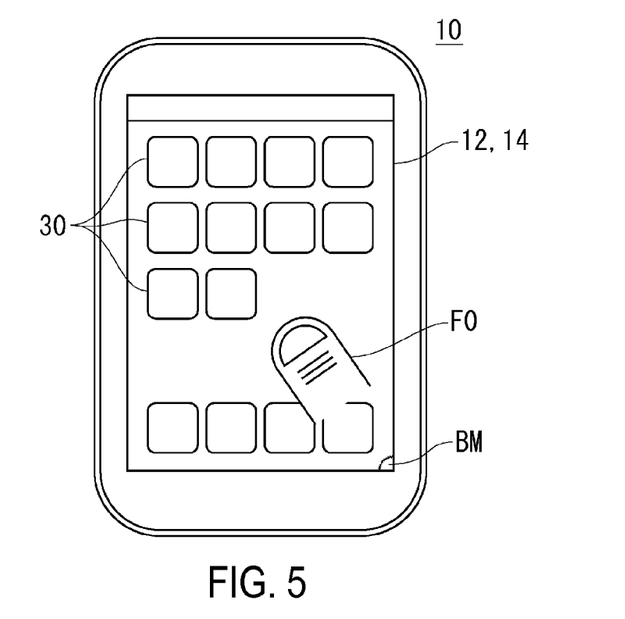
FIG. 5 is a diagram describing the setting of a reference position in an extension mode.

FIG. 5 is a diagram describing the setting of the reference position in the extension mode. That is, FIG. 5 is a diagram describing step S24.

As shown in FIG. 5, when the user touches a predetermined area on the input unit 14, the operation reception unit 20 receives the touch as a reference setting operation. An example of the predetermined area is an area where no operation buttons 30 are displayed. The operation reception unit 20 outputs, to the reference position setting unit 22, the coordinates of the position of the reference setting operation on the input unit 14 at which the user has touched. It is to be noted that, if the area touched by the user has a certain range, the operation reception unit 20 may output the coordinates of a specific position in the touched area (e.g., the centroid position of the touched area) as the coordinates of the position of the reference setting operation.

The reference position setting unit 22 obtains the coordinates of the position of the reference setting operation from the operation reception unit 20, and sets a reference position S0 at a position shifted toward the periphery from the position of the reference setting operation. Specifically, the reference position setting unit 22 determines whether the position of the reference setting operation is in the right-half area or the left-half area of the input unit 14. If the position of the reference setting operation is determined to be in the right-half area of the input unit 14, the reference position setting unit 22 sets the reference position in a peripheral portion on the right side of the input unit 14. If the position of the reference setting operation is determined to be in the left-half area of the input unit 14, the reference position setting unit 22 sets the reference position in a peripheral portion on the left side of the input unit 14. Examples of the peripheral portions on the right side and the left side of the input unit 14 are a lower-right corner portion and a lower-left corner portion of the input unit 14, respectively. In the example shown in FIG. 5, the reference position setting unit 22 determines that the position of the reference setting operation is in the right-half area. The reference position setting unit 22 then sets the reference position S0 in the lower-right corner portion of the input unit 14, for example the lower-right corner. The display control unit 24, upon obtaining the position of the reference position S0 from the reference position setting unit 22, preferably displays a reference indicator BM at the reference position S0 on the display unit 12.

Figure 6:
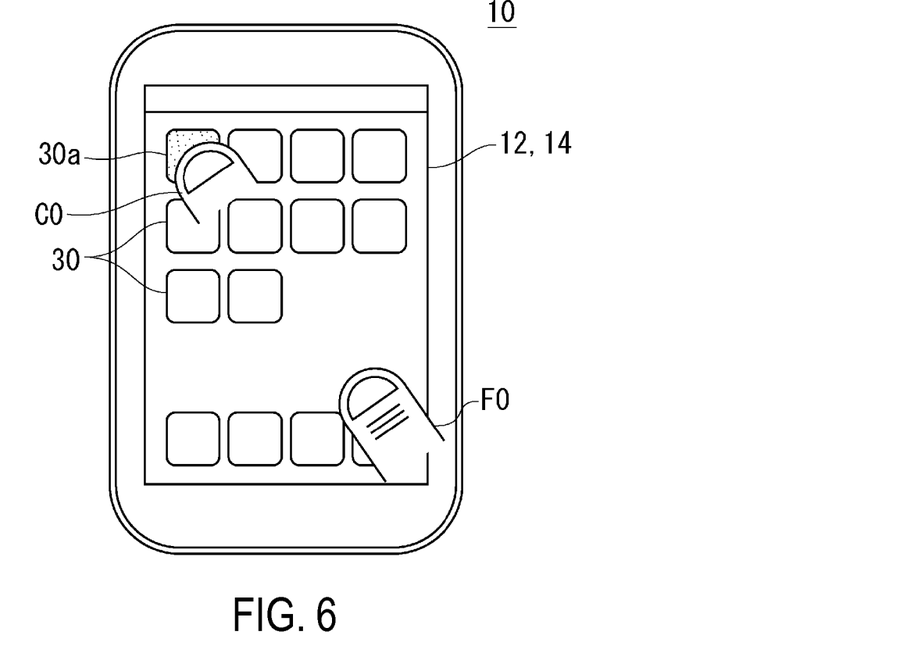
FIG. 6 is a diagram describing a position designation operation and the display of a pointer in the extension mode.
Figure 7:
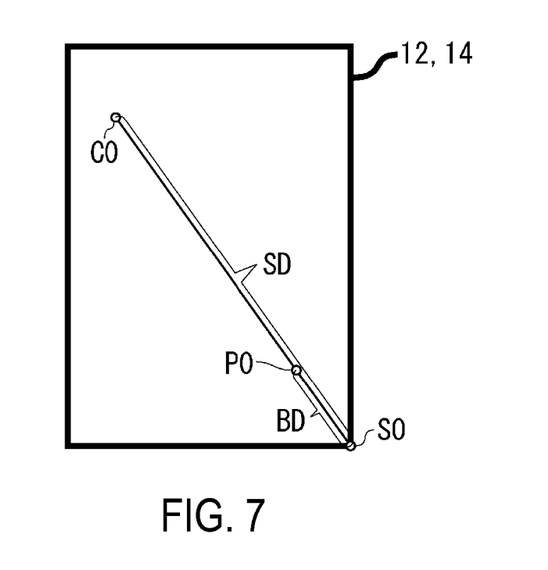
FIG. 7 is a diagram showing that a display control unit 24 obtains the coordinates of the position designation operation and computes a reference distance BD between the reference position and the position of the position designation operation.

FIG. 6 is a diagram describing the position designation operation and the display of the pointer in the extension mode. That is, FIG. 6 is a front view of the electronic apparatus 10 describing steps S26 and S32. FIG. 7 is a schematic diagram describing the setting of the display position of the pointer in the extension mode. That is, FIG. 7 is a diagram describing step S30.

After the reference position is set, the user touches the input unit 14 as shown in FIG. 6, and the operation reception unit 20 receives the touch as a position designation operation. The operation reception unit 20 outputs the coordinates of the position of the position designation operation to the display control unit 24. If the area touched by the user has a certain range, the operation reception unit 20 outputs the coordinates of the centroid position of the touched area as the coordinates of the position of the position designation operation.

As shown in FIG. 7, the display control unit 24 obtains the coordinates of the position designation operation, and computes a reference distance BD as the distance between the reference position S0 and the position P0 of the position designation operation. The display control unit 24 then obtains a predetermined extension scaling factor from the storage unit 18. The display control unit 24 computes the product of the reference distance BD and the extension scale factor and sets the product as an extended distance SD, which is the distance from the reference position S0 to the display position of the pointer C0. The extension scale factor is preferably not smaller than 1, for example 2.5. The display control unit 24 sets the display position of the pointer C0 on a line extending from the reference position S0 through and beyond the position P0 of the position designation operation, and at the extended distance SD from the reference position S0.

As shown in FIG. 6, the display control unit 24 displays the pointer C0 at the set display position on the display unit 12. Although the pointer C0 is in the shape of a thumb or finger in the example shown in FIG. 6, the shape of the pointer C0 may be changed as appropriate. The display control unit 24 preferably sets the pointing direction of the pointer C0 to be parallel with the line extending from the reference position S0 through the position P0 of the position designation operation. This allows the display control unit 24 to make the user feel as if the user's thumb or finger extended. Although the display control unit 24 does not display the line extending from the reference position S0 through the position P0 of the position designation operation on the display unit 12 in the example shown in FIG. 6, the line may be displayed.

As described above, in the extension mode, the reference position setting unit 22 sets the reference position S0 at a position shifted toward the periphery of the input unit 14 from the position of the user's reference setting operation. This allows the display control unit 24 to set the display position of the pointer C0 beyond the position of the position setting operation. As a result, the user can have the pointer C0 displayed at a position farther than the touched position and readily operate, with one hand, distant operation buttons 30 displayed on the side opposite to the user's thumb or finger. Thus, the electronic apparatus 10 can improve the operability. Applying the embodiment to the electronic apparatus 10 of a large size also allows the user to operate operation buttons 30 at positions hard to reach even with both hands.

In the extension mode, the display control unit 24 sets the distance to the pointer C0 as the product of "the reference distance BD from the reference position S0 to the position P0 of the position designation operation" and "the extension scale factor." This allows the display control unit 24 to display the pointer C0 farther than the position of the user's position designation operation with respect to the reference position S0. As a result, the user can have the pointer C0 displayed in areas hard to reach with the user's thumb or finger F0, and operate the operation buttons 30 in these areas.

The display control unit 24 displays the pointer C0 while maintaining the layout, such as the shapes and arrangement of the operation buttons 30, in a single view without displaying any enlarged image in a separate frame on the display unit 12. Thus, the user can accurately and readily operate intended operation buttons 30.

The reference position setting unit 22 sets the reference position at the lower corner portion of the input unit 14 near the base of the user's thumb or finger. Accordingly, the display control unit 24 can display the pointer pivoting about the base of the user's thumb or finger, allowing the user to feel that the remote pointer is displayed at a position of the user's extended thumb or finger. Thus, the electronic apparatus 10 can improve the operability while reducing the user's uncomfortable feeling.

Figure 8:
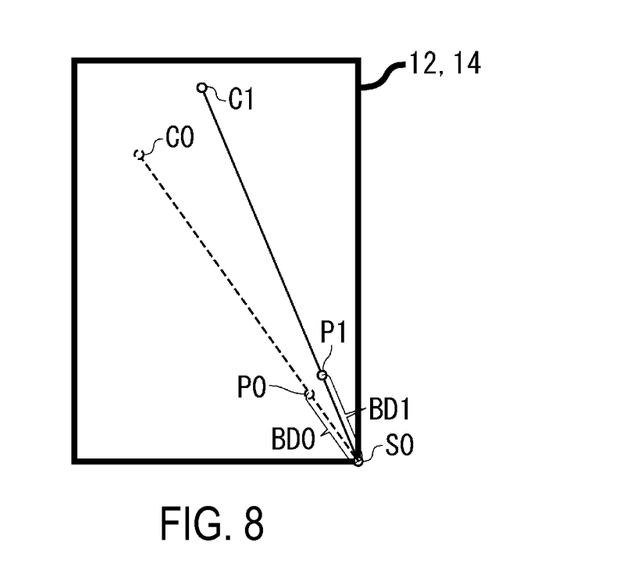
FIG. 8 is a diagram describing the movement of a display position of the pointer as a user moves the position of the designation.

FIG. 8 is a diagram describing the movement of the display position of the pointer as the user moves the position of the position operation designation.

As shown in FIG. 8, it is assumed that the user moves the position of the position designation operation from the position P0 to a position P1. The operation reception unit 20 outputs the coordinates of the position P1 to the display control unit 24. The display control unit 24 computes a reference distance BD1 based on the coordinates of the position P1 and the product with the extension scale factor, and sets a display position of a pointer C1. The display control unit 24 moves the pointer C1 to the display position corresponding to the position P1.

As described above, the display control unit 24 sets the distances to the pointer C0 and C1 as the product of "the reference distances BD0 and BD1 from the reference position S0 to the positions P0 and P1" and "the extension scale factor," respectively. Therefore, the moving distance between the pointer C0 and the pointer C1 is longer than the moving distance between the positions of the user's position designation operations. Since the user can cause the pointer from C0 to C1 to be widely moved with a slight movement of the touched position, the electronic apparatus 10 can realize faster operations.

The display control unit 24 displays the pointer on the lines extending from the reference position S0 through the positions P0 and P1 of the position setting operations, respectively. The electronic apparatus 10 can thus reduce the probability that the user will lose track of the pointer to move.

Figure 9:
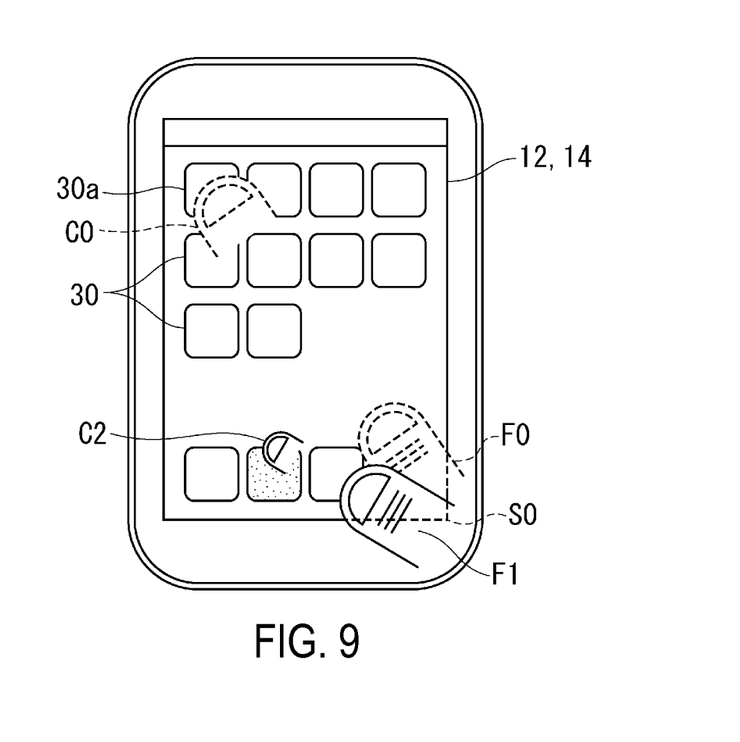
FIG. 9 is a diagram describing an approach with modified pointer display.

FIG. 9 is a diagram describing an approach with modified pointer display. The display control unit 24 may vary the size of the displayed shape of the pointer C0 and C2 depending on the extended distance from the reference position S0 to the position P0 of the position designation operation.

Specifically, as shown in FIG. 9, the display control unit 24 displays the pointer C0 and C2 on the display unit 12 so that the longer the extended distance from the reference position S0 to the position P0 of the position designation operation, the larger the pointer. The display control unit 24 displays the pointer C0 corresponding to the position P0 (which is closer to the reference position S0) to be larger than the pointer C2 corresponding to the position P1 (which is farther from the reference position S0). Alternatively, the display control unit 24 may display the pointer C0 corresponding to the position P0 to be smaller than the pointer C2 corresponding to the position P1. In this manner, the display control unit 24 can cause the user to recognize the change in the extended distance from the reference position S0 to the position of the position designation operation. The display control unit 24 can also provide the user with an operational feeling of an extended thumb or finger.

Figure 10:
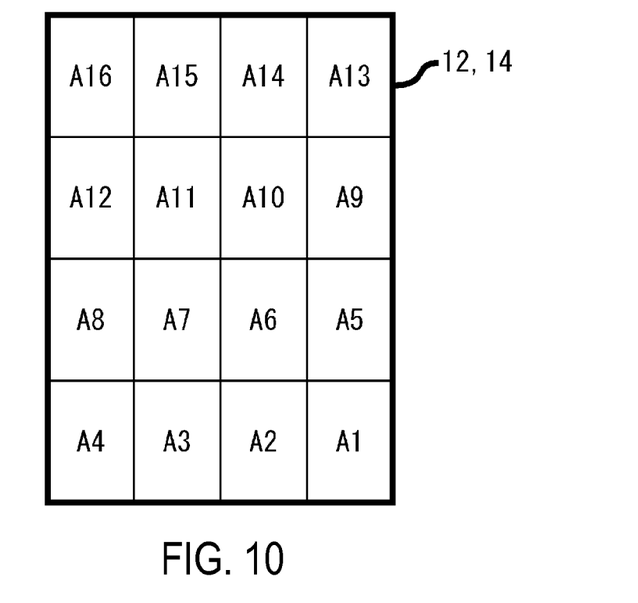
FIG. 10 is a diagram describing another approach to setting the reference position S0.
Figure 11:
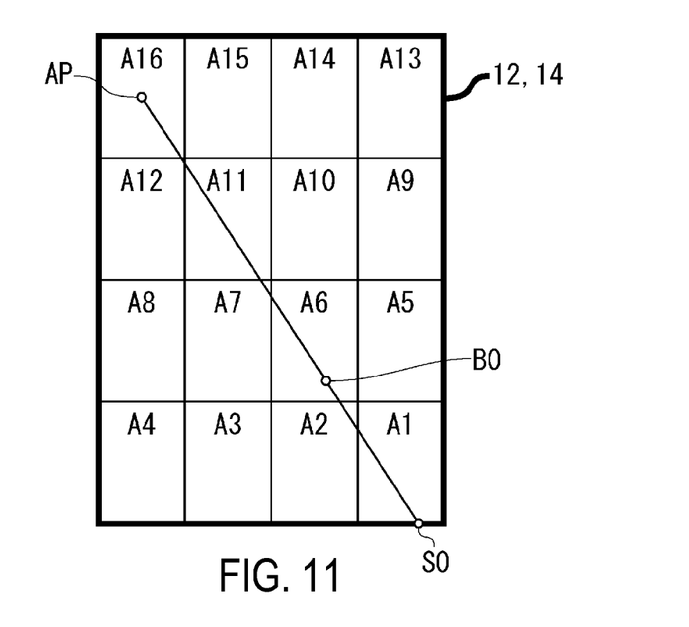
FIG. 11 is a diagram describing the other approach to setting the reference position S0.

FIG. 10 and FIG. 11 are diagrams describing another approach to setting the reference position S0. That is, FIG. 10 and FIG. 11 are diagrams describing another approach to step S24. The approach shown in FIG. 10 and FIG. 11 is valid for the electronic apparatus 10 with the display unit 12 and the input unit 14 implemented as a display and a touch panel of tens of inches, for example.

As shown in FIG. 10, the reference position setting unit 22 vertically and horizontally divides the display unit 12 and the input unit 14 into multiple subareas A. For example, the reference position setting unit 22 divides the display unit 12 and the input unit 14 into 16 subareas A1 to A16 (4 columns by 4 rows). The number of subareas A is not limited but is preferably set depending on the size of the display unit 12 and the input unit 14. Further, the numbers of columns and rows of the subareas A are preferably even numbers. All the subareas A have the same size. In the following description, a subarea that does not need to be specified is denoted with a symbol "A".

The reference position setting unit 22 receives the coordinates of a position B0 of a reference setting operation from the operation reception unit 20. The reference position setting unit 22 identifies a subarea A farthest from the position B0 of the reference setting operation. In the example shown in FIG. 11, the identified farthest subarea is the subarea A16. The reference position setting unit 22 then sets the reference position S0 on a line extending from a predetermined position AP in the subarea A16 through and beyond the position B0 of the reference setting operation. For example, the reference position setting unit 22 sets, as the reference position S0, the intersection of the periphery of the input unit 14 and the line through the positions AP and B0. An example of the predetermined position AP in the subarea is the centroid of the subarea.

In this manner, the reference position setting unit 22 can set the reference position S0 based on the position B0 of the user's reference setting operation, thereby increasing the degree of freedom of the reference position S0. With the reference position S0 shifted to the left from the lower-right corner as in the example shown in FIG. 11, the display control unit 24 can display the pointer near the right edge in response to the user performing a position designation operation in the area right to the reference position S0. As a result, the user can readily operate the operation buttons 30 near the right edge.

The reference position setting unit 22 sets the even numbers of columns and rows of the subareas A. In contrast to the case of odd numbers of columns and rows, a single subarea A farthest from the position B0 of the reference setting operation can be identified. This allows the reference position setting unit 22 to set the more appropriate reference position S0.

Figure 12:
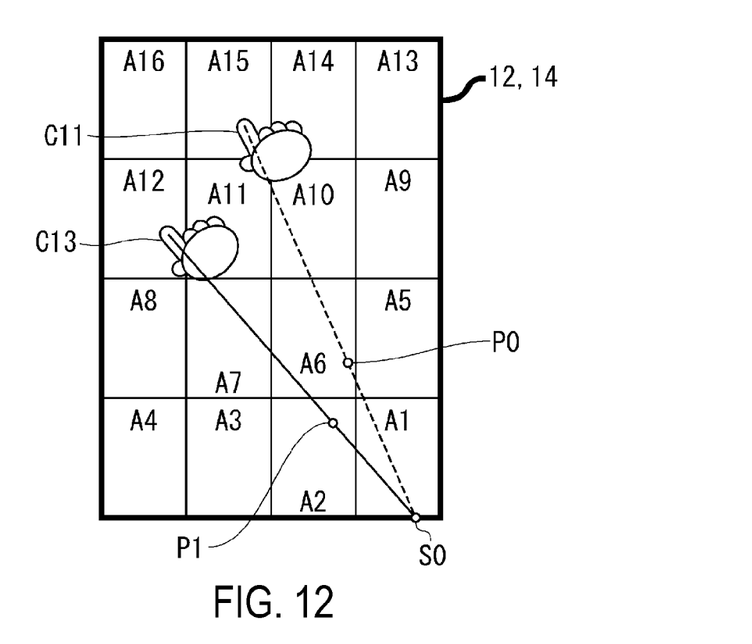
FIG. 12 is a diagram describing the display and movement of the pointer in FIG. 10 and FIG. 11.

FIG. 12 is a diagram describing the display and movement of the pointer in FIG. 10 and FIG. 11. In the example shown in FIG. 12, a pointer C11 and C13 is in the shape of the right forefinger. It is assumed that the user first touches a position P0 on the input unit 14 as a position designation operation, and then moves the touched position to a position P1. The display control unit 24 computes, as the extended distance to the pointer C11, the product of "the reference distance between the reference position S0 and the position P0" and "the extension scale factor." The display control unit 24 sets the display position of the pointer C11 on a line extending from the reference position S0 through the position P0, and at the extended distance from the reference position. The display control unit 24 then displays the pointer C11 at the set display position. Similarly, the display control unit 24 computes the extended distance from the reference position S0 to the pointer C13 and moves the pointer from the position of the pointer C11 to the position of the pointer C13.

Figure 13:
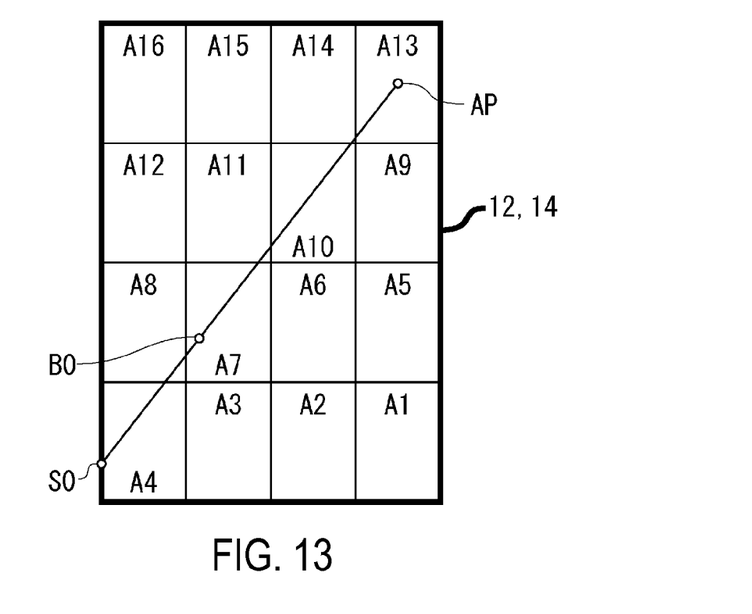
FIG. 13 is a diagram describing the setting of the reference position S0 according to a reference setting operation performed in another area in the approach of FIG. 11.

FIG. 13 is a diagram describing the setting of the reference position S0 according to a reference setting operation performed in another area in the approach of FIG. 11.

As shown in FIG. 13, the user performs a reference setting operation by touching the subarea A7, which is in the left-half area. The reference position setting unit 22 then sets, as the reference position S0, the intersection of the periphery of the input unit 14 and a line extending from a predetermined position AP in the subarea A through and beyond the position B0 of the reference setting operation. In the example shown in FIG. 13, the reference position S0 is set in a lower-left corner portion. It is to be noted that the lower-left corner portion includes the lower-left corner and its neighborhood.

Figure 14:
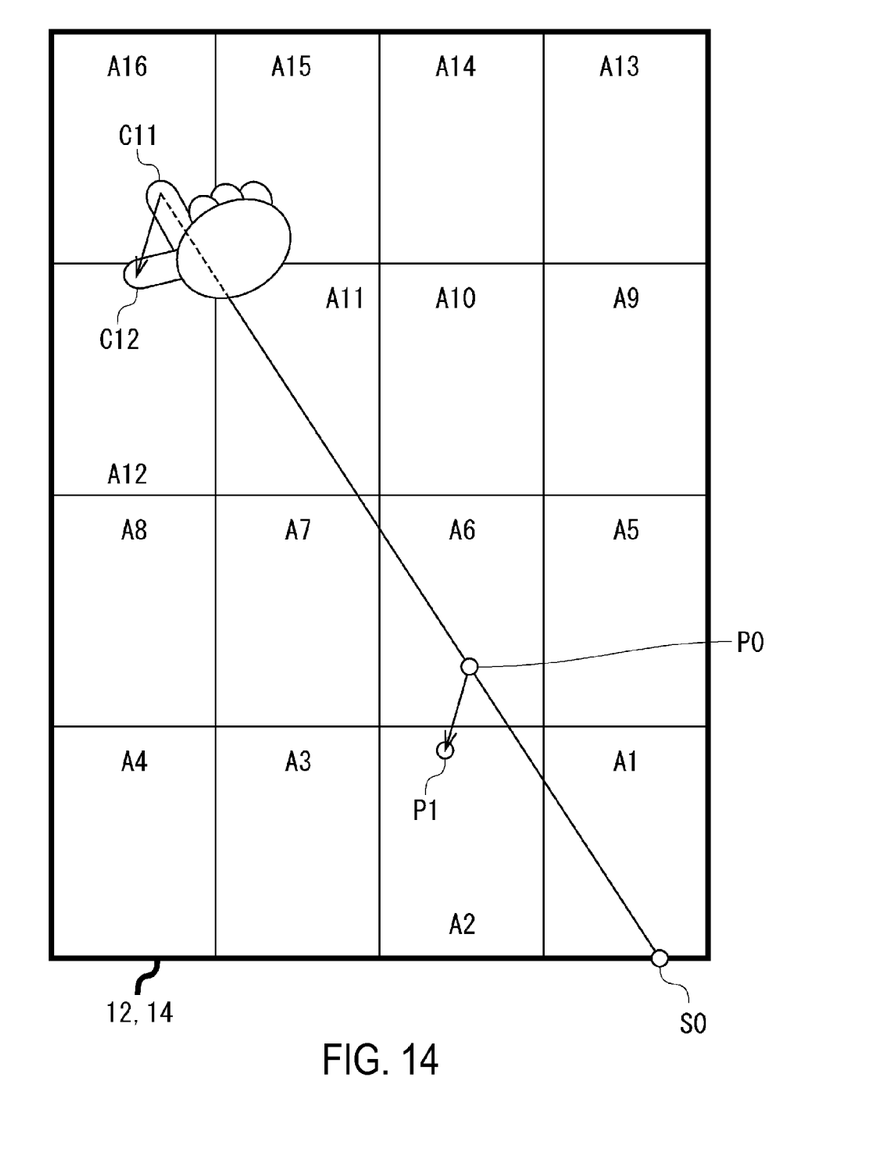
FIG. 14 is a diagram describing an approach enabling multiple positions to be touched on an input unit 14 in the approaches shown in FIG. 10 to FIG. 13.

FIG. 14 is a diagram describing an approach enabling multiple positions to be touched on the input unit 14 according to the approaches shown in FIG. 10 to FIG. 13.

In the example shown in FIG. 14, the user touches a position P0 as a position designation operation after the reference position S0 is set. While doing so, the user further touches a position P1 as a second position designation operation. The durations of touching the positions P0 and P1 partially coincide with each other. Here, "coincide" means overlapping of at least part of the durations of touching the positions P0 and P1, and does not necessarily mean coincidence of the entire durations from the start to the end of the touches. The display control unit 24 performs processing as in the above-described approaches for the touched position P0 of the first position designation operation, thereby setting the display position of a pointer C11 and displaying the pointer C11 on the display unit 12. The pointer C11 is displayed in the shape of the right forefinger.

The display control unit 24 then sets the display position of a second pointer C12 depending on the position P1 and displays the second pointer C12 on the display unit 12. For example, the display control unit 24 sets the display position of the second pointer C12 so that the distance between the display position of the pointer C11 and the display position of the second pointer C12 is not longer than the distance between the position P0 of the position designation operation and the position P1 of the second position designation operation. Since the distance between the display position of the pointer C11 and the display position of the second pointer C12 is not longer than the distance between the position P0 of the position designation operation and the position P1 of the second position designation operation, the electronic apparatus 10 can realize fine operations with the second position designation operation. Alternatively, the distance between the display position of the pointer C11 and the display position of the second pointer C12 may be set to be not shorter than the distance between the position P0 of the position designation operation and the position P1 of the second position designation operation.

As another example, the display control unit 24 sets the display position of the second pointer C12 so that the display position of the second pointer C12 relative to the display position of the pointer C11 corresponds to the position P1 of the second position designation operation relative to the position P0 of the first position designation operation. The relative positions may be computed from the angle between a line extending from the reference position S0 through the position P0 and a line connecting the respective positions, and from the distance between the positions. The display control unit 24 displays, on the display unit 12, the second pointer C12 at the position set relative to the position of the pointer C11. The second pointer C12 is displayed in the shape of the right thumb.

In this manner, the electronic apparatus 10 can realize multi-touch operations with multiple fingers or hands. Exemplary multi-touch operations are operations called pinch-in and pinch-out. Pinch-out is an operation of zooming in on an image by moving two touched positions away from each other. In the extension mode, pinch-out zooms in on an image around the midpoint between the pointer C11 and the second pointer C12. Pinch-in is an operation of zooming out on an image by moving two touched positions toward each other. In the extension mode, pinch-in zooms out on an image around the midpoint between the pointer C11 and the second pointer C12. Pointers displayed in the multi-touch mode may be displayed differently from the pointer displayed in the single-touch mode. For example, the second pointer in the multi-touch mode may take a shape longer than the shape of the pointer in the single-touch mode.

The shapes, arrangements, connection relationships, and values such as the number of elements in the above embodiments may be changed as appropriate. Any of the above embodiments may also be combined with one or more other embodiments.

Although the extension scale factor is a fixed value in the above embodiments, the extension scale factor may be a user-changeable value or a value variable depending on other factors. Variations of the extension scale factor will be described below.

For example, the display control unit 24 may change the extension scale factor depending on the reference distance BD between the reference position S0 and the position P0 of a position designation operation. As an example, as the reference distance BD increases or decreases, the display control unit 24 correspondingly increases or decreases the extension scale factor. Therefore, the farther the user moves the touched position from the reference position S0, the farther the display control unit 24 displays the pointer from the reference position S0 than in the above embodiments. The user can thus operate in distant areas more easily. The extension scale factor may be changed continuously or discontinuously. For example, with the several-inch display unit 12, the extension scale factor may be 1 if the reference distance BD is not longer than 1 inch, and may be 1.5 if the reference distance BD is not longer than 1.5 inches.

The display control unit 24 may set the extension scale factor depending on the size of the display unit 12. For example, the display control unit 24 may increase the extension scale factor as the size of the display unit 12 increases. Specifically, the extension scale factor may be 2 for a smart phone having the 4-inch display unit 12, and may be 5 for a tablet computer having the 10-inch display unit 12. This allows the user to operate easily even on the electronic apparatus 10 having the large display unit 12.

The display control unit 24 may set the extension scale factor depending on the maximum operable range that is input on the input unit 14. The maximum range is input by the user through the input unit 14 and received by the operation reception unit 20. For example, the user may input the maximum range by touching the input unit 14 with the user's spread thumb and finger. Thus, the electronic apparatus 10 can more flexibly accommodate multiple users.

The display control unit 24 may set the extension scale factor depending on user information about the user received by the operation reception unit 20. An example of the user information includes the user's age, sex, and the user's physical information such as the lengths of the user's thumb/finger or hand. The display control unit 24 sets the extension scale factor by, for example, retrieving the extension scale factor associated with the user information and stored in the storage unit 18. Specifically, if the electronic apparatus 10 is a smart phone with the 5-inch display unit 12 and the user is a male in his thirties, an extension scale factor of 2.5 may be stored in the storage unit 18, assuming that the length of the user's thumb is 5 cm (about 2 inches). If the electronic apparatus 10 is a large apparatus with the 80-inch display unit 12 and the user is a male in his thirties, an extension scale factor of 5 may be stored in the storage unit 18, assuming that the length from the user's elbow to the tip of the user's finger is 40 cm (about 16 inches). Thus, the electronic apparatus 10 can set the extension scale factor adapted to the average physical size for the user's age.

The operation reception unit 20 may receive a switching operation and a reference setting operation during the user's continuous single touch on the input unit 14. That is, the operation reception unit 20 may receive a switching operation and a reference setting operation during what is called a long tap. A long tap here refers to keeping on touching the same position on the input unit 14 for more than a predetermined long-tap threshold time by the user. The operation reception unit 20 receives a touch for a period up to the long-tap threshold time as a switching operation, and upon switch to the extension mode, receives the position of this long tap as the position of a reference setting operation. The reference position setting unit 22 sets the reference position depending on the position of the long tap continued after the reception of the switching operation.

The operation reception unit 20 may receive a reference setting operation and a position designation operation during the user's continuous single touch on the input unit 14. That is, the operation reception unit 20 may receive a reference setting operation and a position designation operation during what is called a long tap. Upon receiving a long tap, the operation reception unit 20 receives, as a reference setting operation, the touch on the input unit 14 for an initial period up to a long-tap threshold time, and sets the reference position depending on the position of the long tap. The operation reception unit 20 also receives, as a position designation operation, the touch for a period after the long-tap threshold time, i.e., the touch on the input unit 14 for a period after the reception of the reference setting operation, and receives the position of the long tap as the position of the position designation operation. The display control unit 24 sets the position of the pointer depending on the position of the long tap and displays the pointer.

Further, the operation reception unit 20 may receive a switching operation, a reference setting operation, and a position designation operation during the user's continuous single touch on the input unit 14. That is, the operation reception unit 20 may receive a switching operation, a reference setting operation, and a position designation operation during what is called a long tap. Two long-tap threshold times may be provided for determining whether a touch is a long tap. The two long-tap threshold times will be referred to as a first threshold time and a second threshold time, where the first threshold time is shorter than the second threshold time. If it is determined that the user's touching duration exceeds the first threshold time, the operation reception unit 20 receives the touch on the input unit 14 as a switching operation and a reference setting operation. If it is further determined that the user's touching duration exceeds the second threshold time, the operation reception unit 20 receives the touch on the input unit 14 as a position designation operation. The operation reception unit 20 may also receive the finish of the user's touch on the input unit 14 as a switching operation, thereby terminating the extension mode and switching to the normal mode. Further, in this case, the operation reception unit 20 may receive the finish of the user's touch as a switching operation and operation selection. Therefore, the operation reception unit 20 receives, as a user-selected operation, an operation indicated at the position at which the pointer is displayed when the touch is finished.

In the above embodiments, the corner portion that is set by the reference position setting unit 22 as the reference position is a corner of the input unit 14. However, the corner portion may be an area in the neighborhood of a corner, and the reference position setting unit 22 may set the reference position in that area. For example, the neighborhood area is an area on the lower edge of the input unit 14 within one-quarter of the length of the lower edge from a corner.

Although the above embodiments take a touch panel as an example of the input unit 14, the implementation of the input unit 14 may be changed as appropriate. For example, hardware keys capable of input based on mechanical pressing, or an acceleration sensor capable of input based on shakes of electronics, may be used as the input unit along with a touch panel.

Figure 15:
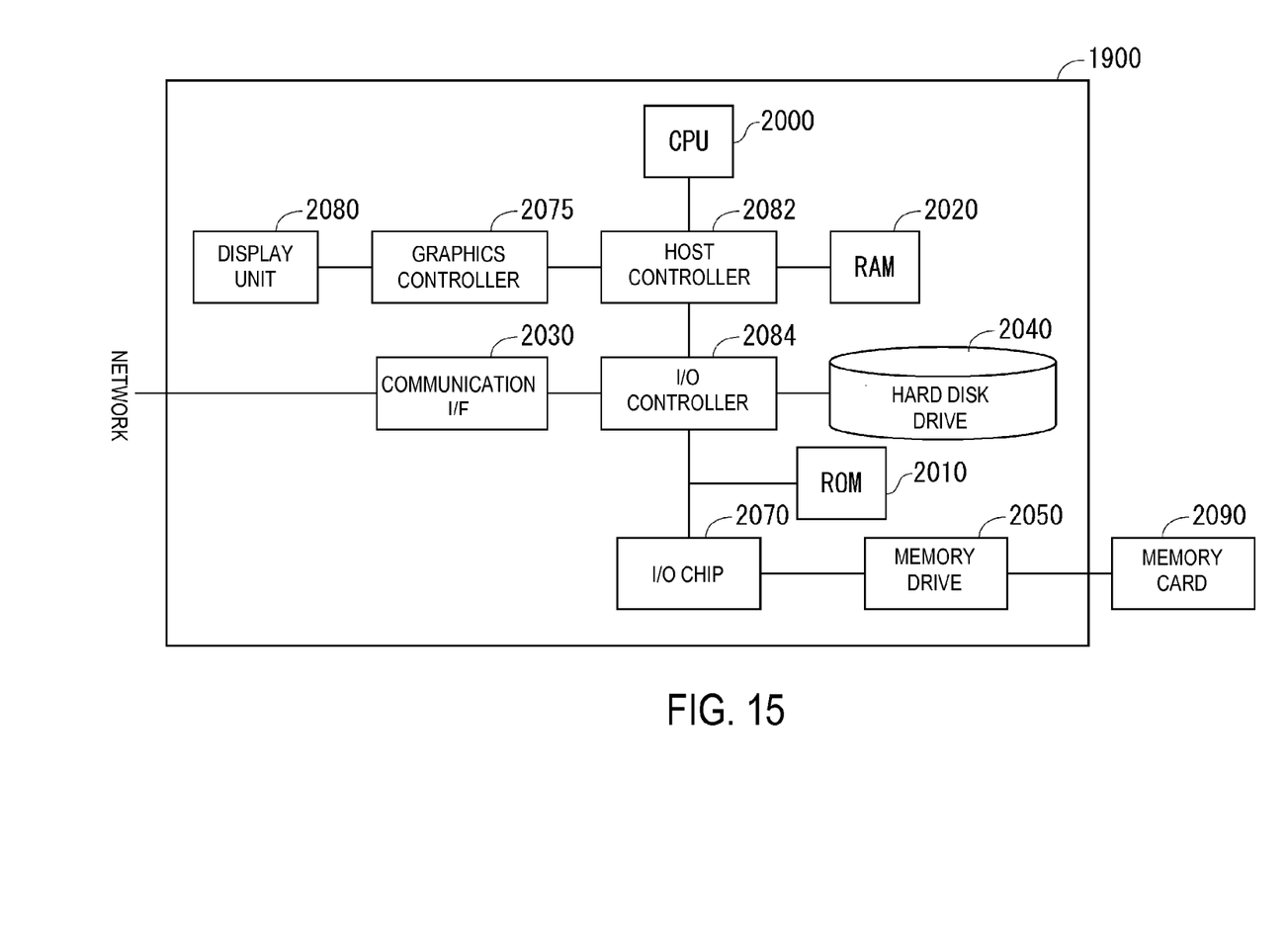
FIG. 15 shows an exemplary hardware configuration of a computer 1900 according to an embodiment.

FIG. 15 shows an exemplary hardware configuration of a computer 1900 according to an embodiment. The computer 1900 according to the embodiment is an example of an information processing unit. The computer 1900 includes: a CPU peripheral section including a CPU 2000, a RAM 2020, a graphics controller 2075, and a display unit 2080 connected with each other by a host controller 2082; an I/O section including a communication interface 2030 and a hard disk drive 2040 connected to the host controller 2082 by an I/O controller 2084; and a legacy I/O section including a ROM 2010, a memory drive 2050, and an I/O chip 2070 connected to the I/O controller 2084.

The host controller 2082 connects the RAM 2020 with the CPU 2000 and the graphics controller 2075, which accesses the RAM 2020 at high transfer rates. The CPU 2000 operates based on programs stored in the ROM 2010 and the RAM 2020 and controls each section. The graphics controller 2075 obtains image data generated by a component such as the CPU 2000 on a frame buffer provided in the RAM 2020, and causes the image data to be displayed on the display unit 2080. Alternatively, the graphics controller 2075 may include therein the frame buffer for storing image data generated by a component such as the CPU 2000.

The I/O controller 2084 connects the host controller 2082 with the communication interface 2030 and the hard disk drive 2040, which are relatively high-speed I/O devices. The communication interface 2030 communicates with other devices via a network. The hard disk drive 2040 stores programs and data used by the CPU 2000 in the computer 1900, such as a display program.

The ROM 2010, and relatively low-speed I/O devices, such as the memory drive 2050 and the I/O chip 2070, are also connected to the I/O controller 2084. The ROM 2010 stores a boot program executed by the computer 1900 upon startup, and/or programs that depend on hardware of the computer 1900. The memory drive 2050 reads programs or data, e.g., the display program, from a memory card 2090 and provides the programs or data to the hard disk drive 2040 via the RAM 2020. The I/O chip 2070 connects the memory drive 2050 to the I/O controller 2084, and connects various I/O devices to the I/O controller 2084 via, for example, a parallel port, a serial port, a keyboard port, and a mouse port.

Programs provided to the hard disk drive 2040 via the RAM 2020 are provided by a user, being stored in a recording medium, such as the memory card 2090 or an IC card. The programs such as the display program are read from the recording medium, installed into the hard disk drive 2040 in the computer 1900 via the RAM 2020, and executed in the CPU 2000.

A program installed into the computer 1900 to cause the computer 1900 to function as the electronic apparatus 10 includes a reference position setting module and a display control module. The program or modules operate on components such as the CPU 2000 to cause the computer 1900 to function as the reference position setting unit 22 and the display control unit 24.

When read into the computer 1900, information processing described in the program functions as the reference position setting unit 22 and the display control unit 24, which are specific means implemented by cooperation of software and the above-described various hardware resources. These specific means are used to provide information operation or processing depending on the intended use of the computer 1900 in the embodiments, thereby building the particular electronic apparatus 10 for the intended use.

As an example, for communication between the computer 1900 and an external device, the CPU 2000 executes a communication program loaded onto the RAM 2020 and, based on processing details described in the communication program, instructs the communication interface 2030 to process communication. Under the control of the CPU 2000, the communication interface 2030 reads transmission data stored in, e.g., a transmission buffer area provided in a storage device, such as the RAM 2020, the hard disk drive 2040, or the memory card 2090, so as to send the transmission data to the network. The communication interface 2030 also writes reception data received from the network to, e.g., a reception buffer area provided in the storage device. In this manner, the communication interface 2030 may transfer the transmission/reception data to and from the storage device using a DMA (direct memory access) scheme. Alternatively, the CPU 2000 may transfer the transmission/reception data by reading data from the transferring storage device or communication interface 2030 and writing data to the receiving storage device or communication interface 2030.

The CPU 2000 also loads onto the RAM 2020 all or necessary part of files or databases stored in an external storage device, such as the hard disk drive 2040 or the memory drive 2050 (the memory card 2090), using, e.g., DMA transfer, thereby performing various sorts of processing on the data on the RAM 2020. The CPU 2000 then writes back the processed data to the external storage device using, e.g., DMA transfer. In this processing, the RAM 2020 may be considered as a temporal storage of the data in the external storage device, so that the RAM 2020 and the external storage device are collectively referred to as memory, a storage unit, a storage device, etc., in the embodiments. Various types of information in the embodiments, such as various programs, data, tables, and databases, are stored in such a storage device and subjected to information processing. The CPU 2000 may also hold part of data of the RAM 2020 in cache memory and read and write on the cache memory. Also in such a case, the cache memory performs part of functions of the RAM 2020, so that the cache memory is considered to be included in the RAM 2020, memory, and/or a storage device in the embodiments unless otherwise stated.

The CPU 2000 performs, on data read from the RAM 2020, various sorts of processing specified by an instruction sequence of a program and described in the embodiments, including various computations, information processing, conditional decision, and information search and replacement, and then writes the processed data back to the RAM 2020. For example, when the CPU 2000 performs conditional decision, the CPU 2000 first determines whether any of various variables described in the embodiments satisfies a condition that the variable be greater than, smaller than, not smaller than, not greater than, or equal to another variable or constant. If the condition is satisfied (or not satisfied), the CPU 2000 branches to a different instruction sequence or calls a subroutine. The CPU 2000 can also search information stored in files or databases in a storage device.

The programs or modules described above may be stored in an external recording medium. The recording medium may be the memory card 2090, as well as an optical recording medium such as a DVD or CD, a magneto-optical recording medium such as an MO, a tape medium, or semiconductor memory such as an IC card. The recording medium may also be a storage device such as a hard disk or RAM provided in a server system connected to a dedicated communication network or the Internet, and the programs may be provided to the computer 1900 via the network.

As described herein, the present invention addresses the difficulty that a user faces when a cursor is displayed at a position beyond a position touched by the user.

While the present invention has been described with reference to the embodiments, the technical scope of the present invention is not limited to what has been described in the above embodiments. It is apparent to those skilled in the art that various modifications or improvements may be made to the above embodiments. It is also apparent from the claims that embodiments with such modifications or improvements may be included in the technical scope of the present invention.

It is to be noted that the processing, such as operations, procedures, steps, and stages, in the devices, systems, programs, and methods described in the claims, specification, and drawings may be implemented in any order unless specified with a term such as "before" or "prior to" or unless output of an earlier process is used in a later process. Although operation flows in the claims, specification, and drawings may be described using a term such as "first" or "next" for convenience of description, it does not mean that the operation flows should be carried out in the described order.

What is claimed is:

1. A control apparatus comprising:
   an operation reception unit receiving a reference setting operation and a position designation operation after the reference setting operation, wherein the reference setting operation and the position designation operation are input by a user touching an input unit provided on a display surface of a display unit;

a reference position setting unit setting a reference position at a second position shifted toward a periphery of the input unit from a first position of the reference setting operation on the input unit; and a display control unit setting, depending on the reference position and the second position of the position designation operation, a display position of a pointer on the display unit; wherein the operation reception unit receives a second position designation operation input with another touch on the input unit coincident with the position designation operation, wherein the display control unit sets a display position on the display unit of a second pointer depending on a position of the second position designation operation, and wherein the display control unit sets the display position of the second pointer such that a distance between the display position of the pointer and the display position of the second pointer is not longer than a distance between the position of the position designation operation and the position of the second position designation operation.

2. The control apparatus according to claim 1, wherein:
the display control unit sets the display position of the pointer on an extended line extending from the reference position through and beyond the second position of the position designation operation.

3. The control apparatus according to claim 1, wherein:
the operation reception unit receives a continuous touch by the user on the input unit, wherein an initial touch by the user for an initial period is received as the reference setting operation, and a subsequent touch on the input unit for a period after a reception of the reference setting operation is received as the position designation operation.

4. The control apparatus according to claim 1, wherein:
the reference position setting unit sets the reference position in a peripheral portion on a right side of the input unit in response to a position of the reference setting operation being in a right-half area of the input unit, and
the reference position setting unit sets the reference position in a peripheral portion on a left side of the input unit in response to a position of the reference setting operation being in a left-half area of the input unit.

5. The control apparatus according to claim 4, wherein:
the reference position setting unit sets the reference position in a lower-corner portion in the peripheral portion of the input unit.

6. The control apparatus according to claim 1, wherein:
the reference position setting unit divides the input unit into a plurality of subareas, and sets the reference position on a line extending through the first position of the reference setting operation and a predetermined position in a subarea farthest from the first position of the reference setting operation.

7. The control apparatus according to claim 1, wherein:
the display control unit sets an extended distance from the reference position to the display position of the pointer depending on a reference distance between the reference position and a position of the position designation operation.

8. The control apparatus according to claim 7, wherein:
the display control unit sets, as the extended distance, a product of the reference distance and an extension scale factor.

9. The control apparatus according to claim 8, wherein:
the display control unit increases and decreases the extension scale factor to track a respective increase and decrease of the reference distance.

10. The control apparatus according to claim 8, wherein:
the display control unit sets the extension scale factor depending on the size of the display unit.

11. The control apparatus according to claim 8, wherein:
the operation reception unit receives a maximum operable range input on the input unit, and
the display control unit sets the extension scale factor depending on the maximum operable range.

12. The control apparatus according to claim 8, wherein:
the operation reception unit receives user information about the user, and
the display control unit sets the extension scale factor depending on the user information.

13. The control apparatus according to claim 1, wherein:
the display control unit sets the display position of the second pointer such that the display position of the second pointer relative to a display position of the pointer corresponds to a position of the second position designation operation relative to a position of the position designation operation.

14. The control apparatus according to claim 1, wherein:
the operation reception unit receives a predetermined switching operation, and
the display control unit switches between a normal mode and an extension mode in response to the predetermined switching operation, wherein, in the normal mode, a selected area for selecting a position on the display unit is set at a position of the position designation operation, and in the extension mode, the pointer is displayed depending on the reference position and a position of the position designation operation.

15. The control apparatus according to claim 14, wherein:
in response to a same position on the input unit being touched for a duration longer than a predetermined threshold time, the operation reception unit determines that the predetermined switching operation has been received.

16. A method comprising:
receiving, by one or more processors, a reference setting operation and a position designation operation after the reference setting operation, wherein the reference setting operation and the position designation operation are input by a user touching an input unit provided on a display surface of a display unit;
setting, by one or more processors, a reference position at a second position shifted toward a periphery of the input unit from a first position of the reference setting operation on the input unit; and
setting, by one or more processors and depending on the reference position and the second position of the position designation operation, a display position of a pointer on the display unit;
wherein the operation reception unit receives a second position designation operation input with another touch on the input unit coincident with the position designation operation, wherein the display control unit sets a display position on the display unit of a second pointer depending on a position of the second position designation operation, and wherein the display control unit sets the display position of the second pointer such that a distance between the display position of the pointer and the display position of the second pointer is not longer than a distance between the position of the position designation operation and the position of the second position designation operation.

17. A computer program product for setting a display position of a pointer, the computer program product comprising a non-transitory computer readable storage medium having program code embodied therewith, the program code readable and executable by a processor to perform a method comprising:

receiving a reference setting operation and a position designation operation after the reference setting operation, wherein the reference setting operation and the position designation operation are input by a user touching an input unit provided on a display surface of a display unit;

setting a reference position at a second position shifted toward a periphery of the input unit from a first position of the reference setting operation on the input unit; and setting, depending on the reference position and the second position of the position designation operation, a display position of a pointer on the display unit;

wherein the operation reception unit receives a second position designation operation input with another touch on the input unit coincident with the position designation operation, wherein the display control unit sets a display position on the display unit of a second pointer depending on a position of the second position designation operation, and wherein the display control unit sets the display position of the second pointer such that a distance between the display position of the pointer and the display position of the second pointer is not longer than a distance between the position of the position designation operation and the position of the second position designation operation.

* * * * *